(12) United States Patent  (10) Patent No.: US 7,875,311 B1
Villalobos et al.  (45) Date of Patent: Jan. 25, 2011

(54) MAGNESIUM ALUMINATE TRANSPARENT CERAMIC HAVING LOW SCATTERING AND ABSORPTION LOSS

(75) Inventors: Guillermo R Villalobos, Springfield, VA (US); Jasbinder S. Sanghera, Ashburn, VA (US); Shyam S Bayya, Ashburn, VA (US); Ishwar D. Aggarwal, Fairfax Station, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 12/418,648

(22) Filed: Apr. 6, 2009

Related U.S. Application Data

(62) Division of application No. 11/094,545, filed on Mar. 24, 2005, now Pat. No. 7,528,086.

(51) Int. Cl.
   *B05D 7/00*   (2006.01)
   *C04B 35/04*  (2006.01)
   *C01D 3/02*   (2006.01)

(52) U.S. Cl. .................. 427/215; 427/212; 501/120; 423/490

(58) Field of Classification Search ........... 501/108, 501/118, 119, 120; 65/600, 594.16, 625, 65/635, 636; 423/600, 594.16, 625, 635, 423/636, 119, 490; 427/212, 215; 428/403, 428/404
See application file for complete search history.

(56) References Cited

U.S. PATENT DOCUMENTS

| | | | | |
|---|---|---|---|---|
| 2,823,134 A * | 2/1958 | Atlas | | 264/669 |
| 3,768,990 A * | 10/1973 | Sellers et al. | | 65/17.5 |
| 4,273,587 A * | 6/1981 | Oda et al. | | 501/153 |
| 5,231,062 A * | 7/1993 | Mathers et al. | | 501/96.1 |
| 5,244,849 A * | 9/1993 | Roy et al. | | 501/120 |
| 5,492,871 A * | 2/1996 | van Zyl et al. | | 501/120 |
| 7,211,325 B2 * | 5/2007 | Villalobos | | 428/403 |
| 7,563,480 B1 * | 7/2009 | Villalobos et al. | | 427/215 |
| 7,611,661 B1 * | 11/2009 | Villalobos et al. | | 264/681 |
| 2004/0266605 A1 * | 12/2004 | Villalobos et al. | | 501/108 |

* cited by examiner

*Primary Examiner*—Karl E Group
*Assistant Examiner*—Noah Wiese
(74) *Attorney, Agent, or Firm*—Amy L. Ressing; Joseph T. Grunkemeyer

(57) ABSTRACT

A ceramic having at least about 90% by weight magnesium aluminate and having a bulk scattering and absorption loss of less than about 1/cm at any wavelength in a range of about 0.23 to about 5.3 microns or 0.2/cm at any wavelength in a range of about 0.27 to about 4.5 microns. A method of making a ceramic by providing a plurality of particles having a magnesium aluminate core and a fluoride salt coating; heating the particles in an oxidizing atmosphere to a temperature in the range of about 400° C. to about 750° C.; and sintering the particles to form a solid ceramic.

4 Claims, 1 Drawing Sheet

MAGNESIUM ALUMINATE TRANSPARENT CERAMIC HAVING LOW SCATTERING AND ABSORPTION LOSS

This application is a divisional application of U.S. patent application Ser. No. 11/094,545, filed on Mar. 24, 2005 and now U.S. Pat. No. 7,528,086.

BACKGROUND OF THE INVENTION

1. Field of the Invention

The invention is generally related to magnesium aluminate spinel.

2. Description of the Related Art

Dense magnesium aluminate spinel is important because it is hard, strong, and could be somewhat transparent from 0.2 to 5.5 μm. Its mechanical properties are several times greater than that of glass and make it a leading candidate for use as a transparent armor, dome, and window material. Commercially it can be used as a stronger and thinner window for laptop computers, cell phones, automotive glassing and headlamps, aerospace windshields, and bar code readers.

However, traditional processing of spinel leads to high scattering and absorption losses that are distributed in localized yet random regions. Basically, the article does not posses uniform optical losses, and consequently the yield is poor, costs are high and large size and different shapes are not possible to manufacture. The scattering sites are typified by voids or inclusions that appear white when viewed in reflected light. The absorbing regions are dark when viewed in both transmitted and reflected light.

Reactions between the LiF sintering aid and the spinel matrix contribute to optical scattering. The common reaction products that contribute to optical scattering are lithium aluminum fluoride and oxyfluoride compounds, magnesium rich grains, unreacted LiF, and compounds that resulted from impurities in the starting spinel powder and sintering aid. A by-product of this is the presence of voids that possess very high scattering efficiencies. The dark absorbing regions are mainly due to hydrocarbons that cracked during the sintering operation, carbon that diffused into the spinel from the furnace/die/die liner environment, or carbon present in the starting powders. In addition they can also be due to the presence of reduced state transition metal ions and silicon. This could also be due to planar precipitates which also scatter light.

Sintering, both pressure-less and with pressure (hot pressing), requires a vast amount of material transport to consolidate an aggregate of loose powder particles into a dense shape. In the case of porcelains and clay products secondary phases do melt and "glue" the primary solid particles together with a glassy phase. These types of systems were the first to be used due to their ease of sintering. However, advanced ceramics do not have these intrinsic sintering aids and must therefore be added. For small samples the powdered sintering aids are mixed to the powder to be sintered with a mortar and pestle. In larger samples, mixing is accomplished by ball milling, attritor milling, high shear wet milling, and variations or combinations of these methods. However, due to the nature of particle-particle interactions, the mixture is far from homogeneous. Inhomogeneity results in areas that have too much sintering aid and other areas that have little or no sintering aid. While this is generally not too important in systems that are relatively easy to sinter, it is a major problem in the fabrication of transparent ceramics, electronic ceramics, and in high tech refractory ceramics. It leads to materials that are inhomogeneous and contain regions of opacity. This adds a tremendous amount of cost to the product since yields are low and size is limited to small regions core drilled out of the large sample.

SUMMARY OF THE INVENTION

The invention comprises a ceramic comprising at least about 90% by weight magnesium aluminate, having a scattering and absorption loss of less than about 1/cm at any wavelength in a range of about 0.23 to about 5.3 microns.

The invention further comprises a method of making a ceramic comprising: providing a plurality of particles comprising a magnesium aluminate core and a fluoride salt coating; heating the particles in an oxidizing atmosphere to a temperature in the range of about 400° C. to about 750° C.; and sintering the particles to form a solid ceramic.

BRIEF DESCRIPTION OF THE DRAWINGS

A more complete appreciation of the invention will be readily obtained by reference to the following Description of the Example Embodiments and the accompanying drawings.

DETAILED DESCRIPTION OF EXAMPLE EMBODIMENTS

Figure 1:
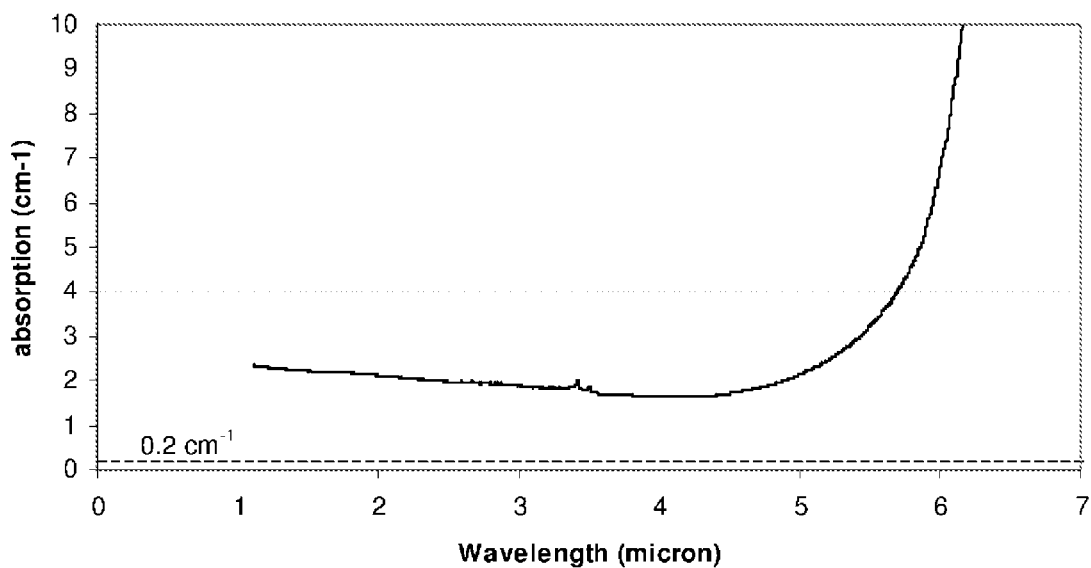
FIG. 1 shows a bulk loss plot of a prior art spinel.

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail. The US Patent Application to Villalobos et al., designated NC 96,921, titled "LiF Coated Magnesium Aluminate," and filed on the same day as the present application is incorporated herein by reference.

The invention generally pertains to a transparent magnesium aluminate spinel polycrystalline ceramic having scattering and absorption loss less than 0.2/cm over a region comprising more than 95% of the originally densified shape. Furthermore, the carbon, silicon, and transition metal contents may be below 50, 300, 50 ppm. While transition metal, silicon, carbon, and MgO content can be minimized in the original chemicals through chemical pre-treatment and judicious selection of chemicals, carbon contamination can subsequently arise from processing and handling and therefore needs to be eliminated by thermal/chemical treatment using an oxidizing environment (e.g. air, oxygen, halogen, etc) prior to densification.

The scattering sites may be reduced or eliminated by homogeneously distributing the sintering aid as a coating on the starting spinel powder particles and agglomerates. This can allow a reduction in the total amount of sintering aid used and consequently reduces the amount of unwanted reaction byproducts that are left in the material as scattering sites. The even distribution of sintering aid also can allow densification under less harsh conditions than traditionally used. The traditional conditions tend to accelerate the formation of reaction byproducts due to higher temperatures and higher time at the elevated temperatures. It has been determined that even a reduction in densification temperature of 100° C. leads to a decrease in the amount of scattering sites. Also, it is prudent to use spinel powder whose concentration of MgO impurity is less than 0.5 volume percent since MgO is a refractory compound and does not sinter well at the temperatures used for making spinel. This typically leads to voids that highly scatter light.

The light absorbing regions can be reduced by two methods: increasing the amount of sintering aid or by baking the loose starting powder (LiF coated spinel) at about 600° C. in air for at least 1 hour or more than 6 hours. The baking temperature is important in that baking at too high temperatures can cause exaggerated grain growth in the subsequently densified body, and lower temperatures may not completely remove the carbon containing species. The LiF also can help to remove transition metal and silicon through formation of volatile products. Although increasing the amount of sintering aid may be effective in reducing the amount of carbon and other species, it may be counter productive in that it increases the amount of scattering sites due to preferential reaction with Al to leave behind MgO phase.

The instant ceramic may be made from particles comprising a magnesium aluminate core and a fluoride salt coating. In one embodiment, these particles may be made from a column-based drying process. A slurry is made by mixing magnesium aluminate cores with a solution of a fluoride salt in a solvent. The magnesium aluminate cores should not dissolve in the solvent. Suitable sizes for the core include, but are not limited to, about 10 nm, 100 nm, 30 µm, 100 µm, and all sizes in between. The cores may be, but are not limited to, approximately spherical particles and agglomerates. Suitable salts include lithium fluoride and aluminum fluoride.

The slurry is sprayed into a drying column. The mixing may occur as a separate step before spraying the slurry into the column, or the mixing and spraying may occur simultaneously as when both components are individually sprayed simultaneously into the column. Other ingredients may also be present. One non-limiting example is when the components are sprayed separately, the cores may need to be mixed with a liquid that may immediately evaporate upon entering the column or otherwise does not significantly affect the process.

The slurry enters the column as an aerosol under thermal conditions that avoid boiling the solvent. As used in this context "boiling" includes a temperature above the boiling point as well as conditions that cause rapid and significant evaporation of the solvent so that forming a coating of salt on the cores is prevented. The aerosol may enter the column at room temperature. Slightly elevated temperatures may also be used. An ultrasonic spray head may be used to spray the slurry into the drying column.

After spraying, the aerosol moves through the column or falls down the column if it is vertically disposed. As the aerosol moves the thermal conditions in the column evaporate the solvent. The term "aerosol" includes the material both before and after any evaporation of solvent. This evaporation results in forming a coating of the fluoride salt on the cores. The thermal conditions substantially avoid spalling. Spalling is when the outer portion of a liquid coating of solution first dries to form a crust around the still liquid inner portion of the coating. When solvent later evaporates from the inner portion, the gaseous expansion may blow off the crust, creating an incompletely coated particle. In some embodiments, the column has a temperature gradient, such that the temperature of the column increases to about 200° C. to about 500° C. as the aerosol travels through the column. This may be a linear increase in temperature, however other types of gradients, including multiple gradients, may be used. Higher temperatures or rapid increases in temperature may cause spalling.

The process can result in a particle comprising a magnesium aluminate core and a fluoride salt coating on the core. The coating thickness may be, but is not limited to 1 nm, 10 nm, 100 μm, 200 μm, 500 μm, and all thicknesses in between.

The LiF coated spinel particles or agglomerates may greatly reduce the densification process requirements to achieve highly dense and uniform shapes of hard to sinter materials. The coated spinel particles can be heat treated after fabrication in different environments such as air, oxygen, or halide atmosphere to remove any unwanted impurities.

The ceramic may be made from a plurality of the coated particles. Initially, the particles may be heated in an oxidizing atmosphere, such as air, to a temperature of about 400° C. to about 750° C., or for example, about 550° C. to about 650° C. This heating may make the particles substantially free of carbon-containing species, such as hydrocarbons, and water. The carbon, silicon, and transition metal contents may be below 50, 300 and 50 ppm, respectively.

The ceramic is then made from the previously heated particles by sintering the particles to form a solid ceramic. The fluoride salt may act as a sintering agent. As used herein, the term "ceramic" refers to a ceramic material in any form, including, but are not limited to, powder, solid mass, mixed with other materials in a homogenous or composite system, and combinations thereof. The term "solid ceramic" refers to an entire solid article that comprises the ceramic.

Sintering is defined as the act of consolidating powder into a dense shape. The powder being sintered must additionally not melt to a great extent, though some melting of secondary phases in the powder, or surface melting is allowed under this definition. If the material melts, the process is referred to as fusion casting. The ceramic may be made by the method described above or by other methods. The ceramic comprises at least about 90%, 95%, or 99% magnesium aluminate. It may have desirable optical properties. The ceramic may have a scattering and absorption loss of less than about 1/cm at any wavelength in the range of about 0.23 to about 5.3 μm. The bulk loss (or in line loss) is not the total loss. A certain amount of light is lost to reflection. Magnesium aluminate inherently has a reflection loss of about 13%. The bulk loss is relative to the light that is not reflected and is equal to $-\ln(T/T_0)/L$, where $T/T_0$ is the ratio of transmitted light to non-reflected light and L is the path length. Although the loss may be more than 1/cm in some portions of that wavelength range, there is at least one wavelength where the loss is less than 1/cm. The loss may also be less than 0.2/cm at any wavelength in the range of about 0.27 to about 4.5 μm.

There may also be a maximum loss across an entire range of wavelengths. For example, the loss may be less than about 1/cm for the entire range of 0.25 to 5.2 μm or the visible spectrum, or 0.2/cm for the entire range of 0.30 to 4.4 μm or the visible spectrum. Any combination of these ranges and losses is also possible.

A solid ceramic comprising the ceramic may also have the same optical properties. The solid ceramic may be pure ceramic and have the above properties through the entire solid body. The solid ceramic may also include imperfections, impurities, or occlusions such that only at least about 80%, 95%, or 99% of the solid ceramic exhibits the properties. Such portion may be distributed throughout the solid ceramic with any degree of homogeneity or heterogeneity. The remaining portion of the solid ceramic may have unrelated optical properties. The solid ceramic may have an average grain size in the range of about 10 μm to about 1000 μm, or more specifically, about 50 μm to about 300 μm. The process may result in these relatively large grain sizes without creating excess imperfections on the surface of the larger grains which may contribute to the desirable optical properties.

The low scattering, low absorption spinel may allow the use of spinel in systems where enhanced light transmission is required. It may be useful in the area of transparent ceramic windows and domes, consumer electronics, lighting, transparent ceramics, electronics, refractory structural ceramics and intermetallics.

Having described the invention, the following examples are given to illustrate specific applications of the invention. These specific examples are not intended to limit the scope of the invention described in this application.

Example 1

Comparative

Traditional method—Spinel was made using a traditional process where 0.7 wt % LiF and 3 μm spinel particles (Condea Vista Co., Ceralox Div.) were mechanically mixed and then densified by hot pressing: ramp 20° C./min to 950° C. hold 30 min. ramp 20° C./min to 1200° C. hold 30 min and ramp 20° C./min to 1650° C. hold 6 hours under vacuum and 8000 psi pressure.

Loss plot (FIG. 1) shows loss of greater than 1/cm and 0.2/cm. The loss varied with position on the sample surface and was random, limiting usefulness of sample.

Example 2

LIF-coated spinel particle—LiF was dissolved in water (0.036 g LiF in 400 mL DI water) to make the stock solution. 116 mL of the stock solution was further diluted with 600 mL ethyl alcohol and then mixed with 15 g of spinel particles, and ultra-sonically sprayed. The column was 60 inches tall. The bottom of the ultrasonic spray head was about 6 inches from the top of the column. A 12 inch tall heater was wrapped around the column, centered at 27 inches from the top of the column. A second such heater was centered 47 inches from the top of the column. The heaters were set at 415° C. at the top heater and 430° C. at the bottom heater. Inside the column the temperatures were approximately about 30° C. at the bottom of the ultrasonic spray head, 150° C. at the center of the top heater and 270° C. at the center of the bottom heater, respectively. The LiF was prevented from coming out of solution until it was falling through the spray-drying column. As the solvents evaporated while falling through the drying column, the LiF reached saturation and deposited on the spinel particle. If the spray droplet were dried too fast the deposited LiF would spall off the particles. If the hot zone were not sufficiently hot the LiF would remain wet and the particles would stick together. The particles were collected in a cyclone separator, then baked at 600° C. for 12 hours in air.

Example 3

Pressing into a transparent shape—The coated powder from Example 2 was placed in a Grafoil®-lined graphite hot press die. The die was placed in an argon/vacuum atmosphere hot press. Minimal pressure was applied until the powder started to densify at approximately 1100° C. and was then stepped up to or above 3000 psi when a temperature at or above 1450° C. was attained. The heating schedule was a 20° C./min ramp to 950° C., a 30 minute hold to allow the LiF to melt and clean/etch the particle surfaces, a 20° C./min ramp to 1200° C., a 30 min hold to allow the now vaporized LiF to leave the hot press die, a 20° C./min ramp to 1650° C., and a 2 hour hold to fully densify the powder into a transparent shape. The heating elements were turned off to allow natural cooling of the hot press and the hydraulic motor was turned off to allow the pressure to bleed off. The use of the LiF coating allowed the hot pressing of the spinel particles in an inert atmosphere into a shape that is above 98% bulk transmission. Optical properties were determined after polishing with silicon carbide paper and 1 μm diamond paper.

Example 4

Figure 2:
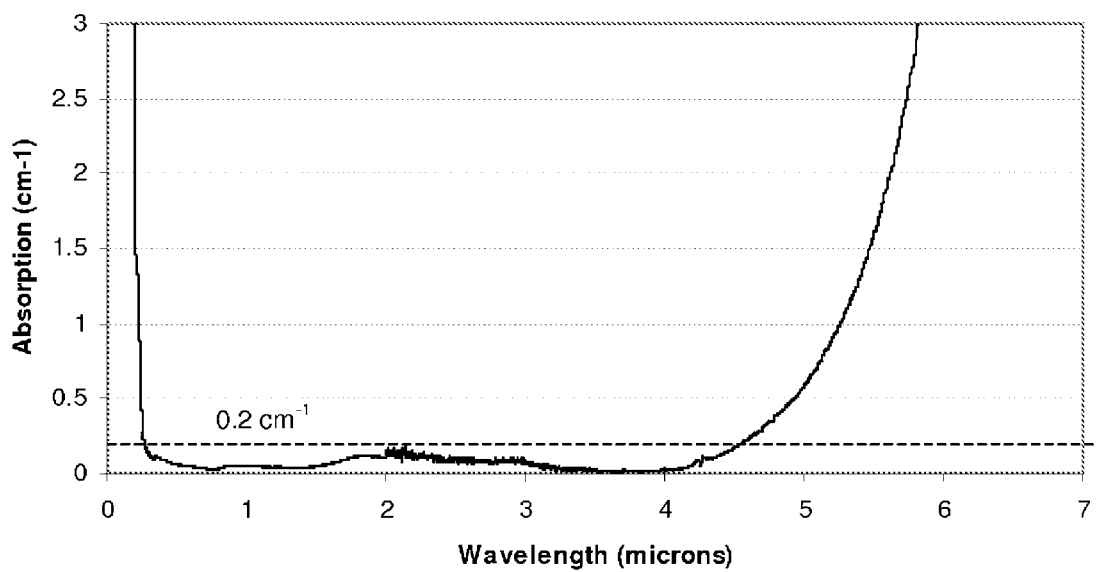
FIG. 2 shows a bulk loss plot of the spinel of Example 4.

Solid ceramic—This example shows the process for making spinel using the LiF coated spinel particles and heat treating them in air prior to densification at 600° C. for 12-18 hours. Hot pressing schedule is the same as in Example 3. Impurity concentrations of carbon, silicon, and transition metal ions were below 50, 300, 50 ppm, respectively, over the entire sample without any specific regions exceeding these values. Loss plot (FIG. 2) shows loss of <0.2/cm. The loss was consistently low all over the sample surface. The process produced a spinel product with high and uniform transparency over large area (>95% of the total surface area).

Obviously, many modifications and variations of the present invention are possible in light of the above teachings. It is therefore to be understood that the claimed invention may be practiced otherwise than as specifically described.

What is claimed is:

1. A method of making a ceramic comprising:
   providing a plurality of particles comprising a magnesium aluminate core and a fluoride salt coating;
   heating the particles in an oxidizing atmosphere to a temperature in the range of about 400° C. to about 750° C.; and
   sintering the particles to form a solid ceramic.

2. The method of claim 1, wherein the fluoride salt is lithium fluoride.

3. The method of claim 1, wherein the fluoride salt is aluminum fluoride.

4. The method of claim 1, wherein providing the particles comprises:
   mixing the magnesium aluminate core with a solution of the fluoride salt in a solvent to form a slurry; and
   spraying the slurry into a drying column;
      wherein the slurry enters the column as an aerosol under thermal conditions that avoid boiling the solvent; and
      wherein the thermal conditions in the column evaporate the solvent as the aerosol moves through the column to form a coating of the fluoride salt on the core while substantially avoiding spalling.

* * * * *